United States Patent [19]

Knifton

[11] 4,124,617

[45] Nov. 7, 1978

[54] PROCESS FOR PREPARING UNSATURATED ALIPHATIC ESTERS FROM ALIPHATIC DIENES

[75] Inventor: John F. Knifton, Austin, Tex.

[73] Assignee: Texaco Development Corporation, New York, N.Y.

[21] Appl. No.: 810,708

[22] Filed: Jun. 28, 1977

[51] Int. Cl.$^2$ .............................................. C09F 5/08; C11C 3/02; C11C 1/00

[52] U.S. Cl. ................. 260/410; 260/410.5; 260/410.6; 260/410.9 R; 260/413; 560/207; 562/522

[58] Field of Search .................. 260/410, 410.5, 410.6, 260/410.9 C, 413 HC, 533 AN; 560/207

[56] References Cited

U.S. PATENT DOCUMENTS

| | | | |
|---|---|---|---|
| 3,437,676 | 4/1969 | Kutepow | 560/207 |
| 3,450,730 | 6/1969 | Scheben | 260/533 AN |
| 3,507,891 | 4/1970 | Hearne | 260/410.9 R |
| 3,755,419 | 4/1973 | Fujii | 260/533 AN |
| 3,856,832 | 12/1974 | Keblys | 260/410.9 R |
| 3,946,855 | 3/1976 | Isa et al. | 260/410.9 R |

OTHER PUBLICATIONS

Tsuji et al., Tetrahedron 28, pp. 3721-3725, (1972).
Billups et al., J.C.S. Chem. Comm., pp. 1067-1068, (1971).

Primary Examiner—Winston A. Douglas
Assistant Examiner—John F. Niebling
Attorney, Agent, or Firm—Thomas H. Whaley; Carl G. Ries; Bernard Marlowe

[57] ABSTRACT

This invention relates to the selective production of fatty acid derivatives from aliphatic diene substrates, such as 1,3-butadiene, in the presence of dual-function homogeneous palladium complexes and certain classes of organic tertiary nitrogen bases.

14 Claims, No Drawings

PROCESS FOR PREPARING UNSATURATED ALIPHATIC ESTERS FROM ALIPHATIC DIENES

SUMMARY OF INVENTION

This invention concerns a process for preparing unsaturated aliphatic carboxylic acids and their ester derivatives from aliphatic conjugated dienes.

More specifically, this inventive process relates to the selective synthesis of linear unsaturated carboxylic (fatty) acids and their ester derivatives via the one-step dimerization, carbonylation of conjugated aliphatic dienes, such as 1,3-butadiene, in the presence of hydroxylated coreactants, homogeneous dual-function palladium catalysts and certain classes of organic nitrogen-containing tertiary bases. The process is exemplified by, but not limited to, the one-step dimerization and carbonylation of 1,3-butadiene to 3,8-nonadienoic acid and its ester derivatives, according to the stoichiometry of eq. 1

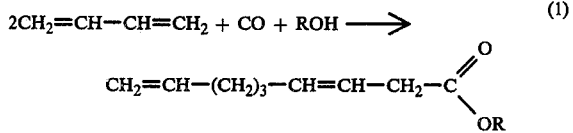

$$2CH_2=CH-CH=CH_2 + CO + ROH \longrightarrow \\ CH_2=CH-(CH_2)_3-CH=CH-CH_2-C\begin{smallmatrix}O\\OR\end{smallmatrix} \quad (1)$$

The inventive process, more fully described infra, has the advantages over the prior art* of ensuring improved palladium catalyst stability during the one-step dimerization and carbonylation of said conjugated diene substrates, improved selectivity to desired linear, unsaturated carboxylic acid/ester derivatives and improved palladium catalyst performance upon recycle with fresh diene substrate.

*See: J. Tsuji et al, Tetrahedron 28, 3721 (1972), W. E. Billups et al, J.C.S. Chem. Comm. 1067 (1971).

The products, particularly the esters of linear carboxylic (fatty) acids are useful progenitors in the formulation of synthetic lubricants and synthetic lubricant additives. Of particular value in these applications are the ester derivatives of said linear carboxylic (fatty) acids with polyols such as pentaerythritol, trimethylol propane and neopentyl glycol.

PROCESS EMBODIMENTS

In the broadest aspect of this invention, unsaturated carboxylic (fatty) acids/esters are prepared from aliphatic conjugated diene substrates by mixing said dienes, in a deoxygenated environment, with a catalytic amount of palladium catalyst precursor, a nitrogen-containing tertiary base, hydroxylated coreactant and carbon monoxide gas and heating said reaction mixture under superatmospheric pressures until the desired unsaturated carboxylic (fatty) acids/esters are formed.

In a narrower practice of this invention, unsaturated carboxylic (fatty) acids/esters* are prepared from aliphatic conjugated diene substrates by the catalytic dimerization, carbonylation of said conjugated dienes by a process comprising the following steps:

*The phrase "acids/esters" throughout this application is interchangeable with the phrase "acids or esters."

(a) Admixing each two moles of said aliphatic conjugated diene to be dimerized and carbonylated with (1) at least a catalytic quantity of a palladium catalyst precursor consisting of one or more palladium salts in combination with one or more Group VB tertiary donor ligands, and (2) at least a molar equivalent of hydroxylated coreactant selected from the group consisting of water or an aliphatic alkanol containing 1 to 12 carbons, in the presence of an organic nitrogen-containing tertiary base selected from the classes of nitrogen-containing bases which include N-heterocyclic amine bases, aryl-containing tertiary amine bases and aliphatic tertiary amides.

(b) Pressurizing said reaction mixture with sufficient carbon monoxide to satisfy the stoichiometry of eq. 1.

(c) Heating said reaction mixture in the temperature range of 30° to 150° C. until substantial formation of desired unsaturated aliphatic carboxylic acid/ester is achieved, and isolating said unsaturated carboxylic (fatty) acid or acid derivative contained therein.

In order to present the inventive concept in the greatest possible detail as to promote its understanding the following supplementary disclosure is submitted:

A. Process Sequence and Variations - In general, the components of the aforementioned reaction mixture including tertiary nitrogen base, hydroxylated co-reactant, aliphatic conjugated diene and palladium catalyst may be added in any sequence as long as sufficiently good agitation is provided to assure the formation of a homogeneous mixture. For example, the following represent some variations insofar as the catalyst, the sequence of CO added to the reaction mixture and heating that may be made without departing from the inventive process. These modifications include:

(1) The palladium catalyst precursor, consisting of one or more palladium salts in combination with one or more Group VB tertiary donor ligands, may be added to the reaction mixture as separate components. To minimize any stability problems with the homogeneous catalysts, it is preferable to add at least two molar equivalents of Group VB donor ligand, such as tri-n-butylphosphine or triphenylphosphine, for each molar equivalent of palladium salt. Optionally, however, a larger excess of Group VB donor ligand may be present before the reaction mixture is heated.

(2) A second variation is that the catalyst is preformed from the palladium salt and Group VB tertiary donor ligands, as described in the literature by Stephenson* and others, and then added to the reaction mixture as the preformed ligand-stabilized palladium salt, eg. bis(triphenylphosphine) palladium(II) acetate.

*T. A. Stephenson et al, J. Chem. Soc. 3632 (1965).

(3) A preferred modification of the procedure is that the palladium catalyst, preformed or prepared in situ, is solubilized in a mixture of the hydroxylated coreactant and tertiary nitrogen base prior to the addition of the aliphatic diene, such as 1,3-butadiene, and carbon monoxide.

(4) A substantial process variation that can be employed is to heat the catalyst containing solution to temperature under an inert atmosphere, or a slightly elevated pressure of CO, and then to add the aliphatic diene and carbon monoxide, with efficient agitation, and to maintain the CO pressure in the reactor until the ester is formed.

B. Homogeneous Palladium Catalyst Complex - The homogeneous palladium catalyst complex of this invention normally consists of at least two components. The first component is a palladium-containing salt, particularly the palladium salt of an organic acid such as palladium(II) acetate, palladium(II) formate, palladium(II) octanoate, palladium(II) propionate, and palladium acetylacetonate. Also suitable are palladium π-allylic complexes such as Pd(π-allyl)(OAc)₂, palladium salts of mineral acids such as palladium(II) nitrate, palladium sulphate and palladium(II) halides such as palladium chloride and palladium bromide when added in combination with excess alkali or alkaline-earth acetates, such as sodium acetate, potassium acetate and calcium acetate.

The second critical component of this homogeneous palladium catalyst is the Group VB tertiary donor ligand. The key elements of these ligands, used to stabilize the palladium(II) salts, are selected from Group VB of the Periodic Chart of the Elements*. They include nitrogen, phosphorus, arsenic and antimony. These elements, in the trivalent oxidation state, particularly tertiary phosphorus, may be bonded to one or more alkyl, cycloalkyl, aryl, substituted aryl, aryloxide, alkyloxide and mixed alkaryl radicals, each containing at least 1 to 12 carbon atoms, or mixtures thereof. Illustrative of suitable ligands used to stabilize the palladium-(II) salts are: $P(C_6H_5)_3$, $As(C_6H_5)_3$, $Sb(C_6H_5)_3$, $P(CH_3)_2C_6H_5$, $P(iso-C_4H_9)_3$, $P(p-CH_3.C_6H_4)_3$, $P(c-C_6H_{11})_3$, $P(OC_6H_5)_3$, $P(p-CH_3.C_6H_4)(C_6H_5)_2$, $P(C_6H_5)_2[3,4-(CH_3O)_2C_6H_3]$, $P(CH_3)_3$, $P(C_2H_5)_3$, $P(n-C_4H_9)_3$, $P(C_8H_{17})_3$, $P(o-CH_3.C_6H_4)_3$, $(C_6H_5)_2As(CH_2-)_2As(C_6H_5)_2$, $P(p-Cl.C_6H_4)_3$ and $P(C_8H_{17})_3$.

*Advanced Inorganic Chemistry, by F. A. Cotton and G. Wilkinson, 2nd Ed., 1966.

A preferred class of Group VB tertiary donor ligands, used in combination with palladium acetate salt, which ensures improved yields of desired unsaturated (fatty) acid/ester and improved palladium catalyst stability, consists of alkylphosphine ligands of pKa $>6.0$,* such as triethylphosphine, tri-n-butylphosphine, tricyclohexylphosphine and tri-n-octylphosphine. The performances of such catalyst combinations are illustrated in Table 1.

*F. E. Paulik, Catalysis Reviews, 6, 55 (1972)

The following are typical combination of palladium salt and Group VB tertiary donor ligands which can be used in the catalytic dimerization, carbonylation of aliphatic dienes to their unsaturated carboxylic acid derivatives: $Pd(OAc)_2$ - $2P(OPh)_3$; $Pd(OAc)_2$ - $2P(O-Et)_3$; $Pd(OAc)_2$ - $2P(p-Cl.C_6H_4)_3$; $Pd(OAc)_2$ - $2PPh_3$; $Pd(OAc)_2$ - $2P(p-CH_3.C_6H_4)_3$; $Pd(OAc)_2$ - $2P(n-Bu)_3$; $Pd(OAc)_2$ - $2P(c-C_6H_{11})_3$; $Pd(OAc)_2$ - $2PEt_3$; $Pd(OAc)_2$ - $P(o-CH_3.C_6H_4)_3$; $Pd(OAc)_2$ - DIARS $Pd(PPh_3)_2(OAc)_2$; $Pd(NO_3)_2$ - $2P(n-Bu)_3$; $Pd[PPh_2(3,4-(CH_3O)_2-C_6H_3)]_2Cl_2$ - 10 NaOAc; $PdCl_2$ - $2P(n-Bu)_3$ - 10 NaOAc; $Pd(Acec)_2$ - $2P(n-Bu)_3$, and $Pd(OAc)_2$ - $2P(C_6H_{17})_3$.

The performances of each of these palladium catalyst combinations are illustrated in Tables 1 and 2. Generally, to achieve good yields of desired product and maximum palladium catalyst stability, at least one molar equivalent of Group VB tertiary donor ligand should be present per gram atom of palladium. Higher ratios are not deleterious, and are illustrated here by the data in Table 4 for the synthesis of isopropyl nonadienoate from 1,3-butadiene.

C. Ratio of Palladium Catalyst to Aliphatic Diene Substrate - Experimental work indicates that a molar ratio of up to 500 moles of diene per mole of palladium-(II) catalyst complex can be employed in most instances where the aliphatic dienes, typified by 1,3-butadiene, are used as the substrate. This molar ratio constitutes what is referred to as a catalytic amount. Much lower ratios (i.e., 25 moles of diene substrate per mole of platinum halide) are not harmful but are economically unattractive. For this reason the preferred molar range is from 50 to 400 moles of diene substrate per mole of palladium metal catalyst.

D. Tertiary Nitrogen Base - The selective production of unsaturated carboxylic (fatty) acids and their derivatives from aliphatic diene substrates is most conveniently carried out in the presence of certain organic tertiary nitrogen bases. Suitable classes of tertiary nitrogen base that are effective in providing improved yields of desired carboxylic acid derivative and improved palladium catalyst stability include heterocyclic nitrogen bases, for example, pyridine, alkylated pyridines such as the picolines, lutidines such as 3,5-lutidine and collidines such as 2,4,6-collidine, pyrazine and alkylated pyrazines such as 2-methylpyrazine, quinoline, isoquinoline and substituted derivatives thereof such as lepidine and quinaldine, and polyaromatic N-heterocyclics, for example, acridine and mixtures thereof.

A second class of suitable tertiary nitrogen base is tertiary aromatic amines, such as N,N-dimethylaniline, N,N-diethylaniline, N,N-diethyltoluidine and N,N-dibutyltoluidine. Additionally, aliphatic and aromatic amides such as N,N-dimethylformamide and N-methyl-2-pyrrodidine and the like are quite effective. All of the above-named nitrogen-containing bases have an ionization constant less than $10^{-8}$*. Stronger tertiary bases, i.e., those having an ionization constant higher than $10^{-8}$, such as triethylamine and N-methylmorpholine, and deleterious and suppress the yield of desired carboxylic acid derivative. Primary and secondary amines such as imidazole, indole, 8-aminoquinoline and tetraethylenepentamine also show lower yields of desired product and, in some cases, evidence for competing octadienyl amine formation.

*"Carbon Monoxide in Organic Synthesis," by J. Falbe, p. 19, 1970.

Confirmation of these three preferred classes of tertiary nitrogen bases of ionization constants less $10^{-8}$ is illustrated in Table 3, for the synthesis of isopropyl nonadienoate from 1,3-butadiene.

E. Operating Temperature - The temperature range which can be employed for ester formation is variable dependent upon other experimental factors including the substrate employed, the pressure, the concentration and the particular choice of catalyst among other things. Again using butadiene as a typical conjugated aliphatic diene substrate and $Pd(OAc)_2$ - $2[P(C_6H_5)_3]$ as a representative catalyst, the range of operability is from about 30° to 150° C. when superatmospheric pressures of CO are employed. A narrower range of 70° C. to 120° C. represents the preferred temperature range when the aforementioned conjugated diene is carbonylated using the catalyst system described supra. Table 4 is evidenciary of how this narrower range is derived.

F. Pressure - Superatmospheric pressures of 100 psig to at least 3000 psig lead to substantial conversion of the conjugated diene to the ester of unsaturated carboxylated acid at temperatures of 30° to 150° C. using $Pd(OAc)_2$ - $2[P(C_6H_5)_3]$ as catalyst and butadiene as the substrate. Table 4 provides the supporting experimental data.

G. Reaction Times Required - As previously indicated in the analogous discussion on temperatures and pressures required in the reaction, experimental variables are important in arriving at reaction times. Generally, substantial conversions (70% or higher) of the conjugated diene substrates to the ester of an unsaturated carboxylic acid can almost always be accomplished within 20 hours with 4 to 18 hours representing the more usual reaction time interval.

H. Conjugated Aliphatic Diene - As used throughout this disclosure, this term refers to a class of conjugated aliphatic linear dienes and cyclic diene substrates wherein the unsaturation in the substrate is only between adjacent carbon-to-carbon atoms. Illustrative of conjugated aliphatic dienes suitable as starting materials in this invention are those having from four to eight carbon atoms per molecule. The preferred aliphatic diene substrate is 1,3-butadiene; other conjugated open-chain diolefins, particularly 1,3-diolefins, that may be useful include 2-methyl-1,3-butadiene (isoprene), 2,3-dimethyl-1,3-butadiene, 2-chloro-1,3-butadiene (chloroprene), 1,3-pentadiene(piperylene), phenyl diolefins and 2,4-hexadiene.

I. Hydroxylated Coreactant - If it is desired to prepare unsaturated carboxylic acids, water must be present in the reaction mixture in sufficient concentration to satisfy the stoichiometry of equation 1. Where it is desired to prepare unsaturated aliphatic carboxylic acid esters an alcohol coreactant should be included in the reaction mixture with the conjugated aliphatic substrate, palladium catalyst and tertiary nitrogen base. The alcohol may be a monohydric primary, secondary or tertiary alkanol of up to at least twelve carbon atoms, a substituted alcohol, a phenol, or a substituted phenol. Suitable examples include methanol, ethanol, isopropanol, dodecanol, phenol, tertbutanol, 2-chloroethanol, 2-ethylhexanol, methylcyclohexanol and the like. Suitable monohydroxylated coreactants, useful in the synthesis of nonadienoic acid and nonadienoate ester derivatives, are illustrated in Table 5.

Alternatively, the alkanol coreactant may be a polyol containing two or more hydroxyl groupings. Illustrative examples of suitable polyols include propylene glycol, neopentyl glycol, trimethylol propane and pentaerythritol.

J. Carbon Monoxide Environment - Insofar as can be determined, the best selectivities and conversions of the conjugated aliphatic dienes to aliphatic ester can be obtained within a reasonable reaction time by using a substantially carbon monoxide gaseous atmosphere. However, particularly in continuous operation the carbon monoxide may be used in conjunction with from about 0 to 30% by volume of one or more inert gases such as nitrogen, argon, neon and the like without experiencing substantial decrease in yield and selectivity.

K. Selectivity - Selectivity is defined herein as the efficiency in catalyzing the desired diene dimerization, carbonylation reaction sequence relative to other undesired competing carbonylation reactions. It is expressed here as a percentile, and is calculated by determining the quantity of desired unsaturated fatty acid derivative formed, divided by the total amount of carbonylated products formed, and multiplying the quotient obtained by 100.

L. Yield - As defined herein, yield is the efficiency in catalyzing the desired diene dimerization, carbonylation reaction relative to other undesired reactions. In this instance diene dimerization, carbonylation is the desired conversion. Yield is expressed as a percentile, and is calculated by determining the amount of desired unsaturated carboxylic acid or acid derivative formed, divided by the amount of conjugated aliphatic diene charged and multiplying the quotient obtained by 100.

M. By-Products - As far as can be determined, without limiting the invention thereby, the one-step dimerization, carbonylation of conjugated diene substrates leads primarily to the formation of only two classes of by-products. These by-products, formed only in minor amounts arise from (a) oligomerization of the conjugated diene to form a higher MW polyene, and (b) carbonylation of the conjugated diene, without diene dimerization. Where 1,3-butadiene is the substrate, these by-products are principally 4-vinyl-1-cyclohexane, 1,3,7-octatriene and 3-pentenoic acid or its ester derivatives.

For runs made under various experimental conditions, the extent of by-product formation is listed in the following tables under percent selectivity and total ester/total polyene ratio.

These by-products may be separated from the desired unsaturated carboxylic acids and their esters by the usual chemical or physical techniques.

N. Identification Procedures - Where applicable, the products of this invention are identified by one or more of the following analytical procedures - gas chromatography (GC), infrared (IR) elemental analysis and nuclear magnetic resonance (MNR). Unless otherwise specified, all parts are by weight, all temperatures in degrees centigrade and all pressures in pounds per square inch gauge (psig).

Having described the inventive process in general terms, the following examples are submitted to supply specific and illustrative embodiments.

EXAMPLE 1

THE SYNTHESIS OF ISOPROPYL NONADIENOATE FROM 1,3-BUTADIENE

To a glass-lined autoclave reactor equipped for pressurizing, heating, cooling and means of agitation is added a degassed sample of quinoline (40 ml) and isopropanol (20 ml). Tri-n-butylphosphine (0.56 gm) and palladium acetate (0.30 gm) are added under a nitrogen environment and the mixture stirred to give a clear, deep-red solution. The reactor is then sealed, deoxygenated with a purge of nitrogen, and butadiene (20 gm, 0.37 mole) injected in from a side ampoule. The reactor is further pressured to 700 psig with carbon monoxide and the mixture heated, with agitation, to 110° C. At the end of 18 hr the reaction is terminated by rapid cooling.

The deep-red liquid product (85 ml) is recovered from the glass liner and analyzed by gas chromatography (GC) as follows:

Isopropyl nonadienoate selectivity 91.4%

Yield of isopropyl nonadienoate 61.6 mole %

Elemental analyses of the crude product liquid confirms >95% palladium recovery (basis $Pd(OAc)_2$ charged) with no visual evidence of palladium precipitation on the liner walls etc.

The isopropyl nonadienoate is recovered from the crude liquid mix by fractional distillation, in vacuo. The primary fraction is confirmed by NMR and IR to be the isopropyl 3,8-nonadienoate isomer.

EXAMPLES 2 TO 15

THE DIMERIZATION/CARBONYLATION OF BUTADIENE CATALYZED BY VARIOUS SOLUBLE PALLADIUM CATALYSTS - EFFECT OF LIGAND STRUCTURE

In these preparations, the dimerization and carbonylation of 1,3-butadiene to isopropyl nonadienoate is carried out in accordance with the procedure of Example 1 using various soluble palladium catalysts, but under constant conditions of temperature, pressure, and initial butadiene-to-Pd ratio. Quinoline, predistilled and dried, is the primary solvent in each of these examples. As can be seen from the run data, summarized in Table 1 which follows, a variety of Group VB tertiary donor ligands can be used, in combination with palladium acetate, for the selective synthesis of nonadienoate esters. Suitable Group VB donor ligands may be monodentate or multidentate, and may contain the alkyl, aryl, aryloxide, alkyloxide, cycloalkyl, substituted aryl and mixed alkaryl radicals.

The ligand-stabilized palladium complex may be prepared prior to reaction, as in Example 14, or prepared in situ.

Good butadiene conversions and isopropyl nonadienoate yields are realized with palladium acetate in combination with alkylphosphines of pKa >6 such as tri-n-butylphosphine, triethylphosphine, trioctylphosphine and tricyclohexylphosphine (Examples 7-10). A further advantage of these palladium catalysts, when solubilized in N-heterocyclic solvents such as quinoline, is the essentially quantitative recovery of palladium in solution, with no evidence of metal precipitation following butadiene dimerization/carbonylation.

It may be noted that no nonadienoate ester is detected in the absence of the Group VB tertiary donor ligand, using palladium acetate alone (Example 15).

out in accordance with the procedure of Example 1 using various soluble palladium catalysts, but under constant conditions of temperature, pressure and initial butadiene-to-Pd ratio. Quinoline, predistilled and dried, is the primary solvent in each example. As can be seen from the data in Table 2, a variety of palladium salts, in combination with tertiary Group VB donor ligands, are effective for the synthesis of nonadienoate esters from 1,3-butadiene. Suitable palladium salts include palladium acetate, nitrate, acetylacetonoate together with ligand-stabilized palladium salts such as ($\pi$-allyl)palladium acetate and bis(triphenylphosphine)palladium acetate. Also suitable are palladium halides and ligand-stabilized palladium halides such as palladium chloride and bis(diphenyl,3,4-dimethoxyphenylphosphine)palladium chloride when present with excess alkali or alkaline earth acetate such as sodium acetate.

EXAMPLES 22 to 39

THE DIMERIZATION/CARBONYLZATION OF BUTADIENE CATALYZED BY VARIOUS SOLUBLE PALLADIUM CATALYSTS - EFFECT OF SOLVENT STRUCTURE

In these preparations, the dimerization/carbonylation of 1,3-butadiene to isopropyl nonadienoate is carried out in accordance with the procedure of Example 1 using the palladium acetate - triphenylphosphine cata- Table 1

| | Butadiene Dimerization/Carbonylation-Effect of Ligand Structure[a] | | | | |
|---|---|---|---|---|---|
| | | Isopropyl nonadienoate | | Total ester/$C_8$-polyene | Pd recovery |
| Example | Catalyst composition | Yeild(mol%)[b] | Selectivity (%)[c] | ratio (wt)[d] | (%)[e] |
| 2 | Pd(OAc)$_1$-2P(OPh)$_3$ | 8.0 | 82.6 | 4.30 | |
| 3 | Pd(OAc)$_2$-2P(OEt)$_3$ | 7.7 | >99 | 0.59 | |
| 4 | Pd(OAc)$_2$2P(p-Cl—C$_6$H$_4$)$_3$ | 11.8 | >99 | 0.62 | |
| 5 | Pd(OAc)$_2$-2PPh$_3$ | 44.7 | 96.8 | 3.36 | |
| 6 | Pd(OAc)$_2$-2P(p-CH$_3$—C$_6$H$_4$)$_3$ | 52.5 | 96.3 | 4.85 | |
| 7 | Pd(OAc)$_2$-2P(n-Bu)$_3$ | 61.6 | 91.4 | 5.34 | >95 |
| 8 | Pd(OAc)$_2$-2P(c-C$_6$H$_{11}$)$_3$ | 55.1 | 96.8 | 4.85 | |
| 9 | Pd(OAc)$_2$-2PEt$_3$ | 62.8 | 90.8 | 4.37 | >95 |
| 10 | Pd(OAc)$_2$-2P(n-C$_8$H$_{17}$)$_3$ | 60.0 | 92.0 | 4.8 | |
| 11 | Pd(OAc)$_2$-2P(o-CH$_3$—C$_6$H$_4$)$_3$ | 10.8 | 92.8 | 0.97 | |
| 12 | Pd(OAc)$_2$-DIARS | 0.71 | 74 | 0.08 | |
| 13 | Pd(OAc)$_2$2AsMe$_3$ | 1.2 | >95 | 0.07 | |
| 14 | Pd(PPh$_3$)$_2$(OAc)$_2$ | 33.6 | 96.9 | 3.62 | |
| 15 | Pd(OAc)$_2$ | none | — | — | |

[a]Run conditions: [Pd], 22.3 mM; C$_4$H$_6$, 0.37 moles; quinoline/isopropanol (2:1, v/v), solvent; 110° C; 700 psig CO initial pressure; 18 hr.
[b]Isopropyl 3,8-nonadienoate yield basis butadiene charged (theory), estimated by GLC.
[c]Selectivity basis; isopropyl 3,8-nonadienoate yield/total ester yield, estimated by GLC.
[d]Total isopropyl C$_9$+C$_5$ acid esters/total C$_8$-olefin in liquid product.
[e]Determined from palladium concentration in crude product liquid.

EXAMPLES 16 to 21

THE DIMERIZATION/CARBONYLATION OF BUTADIENE CATALYZED BY VARIOUS SOLUBLE PALLADIUM CATALYSTS - EFFECT OF COUNTERION STRUCTURE

In these preparations, the dimerization, carbonylation of 1,3-butadiene to isopropyl nonadienoate is carried lyst precursor solubilized in various liquid media consisting of an amine in combination with isopropanol coreactant. The run data, summarized in Table 3, show improved isopropyl nonadienoate ester yields and improved palladium catalyst Table 2

| | Butadiene Dimerization/Carbonylation - Effect of Counterion Structure[a,b] | | | | |
|---|---|---|---|---|---|
| | | Isopropyl nonadienoate | | Total ester/ C$_8$ olefin | Pd recovery |
| Example | Catalyst composition | Yield(mol%) | Selectivity(%) | (wt) | (%) |
| 16 | Pd(OAc)$_2$-2P(n-Bu)$_3$ | 61.6 | 91.4 | 5.34 | >95 |
| 17 | Pd(NO$_3$)$_2$ · xH$_2$O-2P(n-Bu)$_3$ | 55.2 | 92.1 | 3.88 | >95 |
| 18 | Pd(Acec)$_2$-2P(n-Bu)$_3$ | 41.3 | 91.1 | 2.83 | >95 |
| 19 | Pd($\pi$-Allyl)(OAc)$_2$2P(n-Bu)$_3$ | 31.2 | 81.8 | 3.0 | |
| 20 | Pd[PPh$_2$(3,4-(CH$_3$O)$_2$C$_6$H$_3$)]$_2$Cl$_2$-10NaOAc | 41.5 | 96.6 | 5.08 | >95 |

Table 2-continued

| | Butadiene Dimerization/Carbonylation - Effect of Counterion Structure[a,b] | | | | |
|---|---|---|---|---|---|
| | | Isopropyl nonadienoate | | Total ester/ $C_8$ olefin | Pd recovery |
| Example | Catalyst composition | Yield(mol%) | Selectivity(%) | (wt) | (%) |
| 21 | $PdCl_2$-2P(n-Bu)$_3$-10NaOAc | 60.5 | 92.0 | 5.10 | >95 |

[a]Run conditions: [PD], 22.3 mM, $C_4H_6$, 0.37 mole, quinoline/isopropanol (2.1, v/v), solvent; 110° C; 700 psig.
[b]Terms as defined in Table 1.

stability when said ester syntheses are carried out in N-heterocyclic amine bases, aliphatic and aromatic amides and tertiary aromatic amine solvents. Illustrative of suitable N-heterocyclic amine bases are pyridine, quinoline, isoquinoline, quinaldine, 3,5-lutidine, lepidine, and acridine. Suitable amides include N,N-dimethylformamide and N-methylpyrrolidone, tertiary aromatic amines like N,N-diethylaniline also proved to be suitable solvents in this application.

Stronger tertiary nitrogen bases of ionization constants $>10^{-8}$, such as triethylamine and N-methylmorpholine effectively suppress nonadienoate ester yields. Primary and secondary amines such as imidazole, indole, 8-aminoquinoline and tetraethylenepentamine also show lower ester yields and evidence, in some cases, of competing octadienyl amine formation.

A base-line run with no added amine (Example 22) is included here for comparison.

EXAMPLES 40 to 48

THE DIMERIZATION/CARBONYLATION OF BUTADIENE - THE EFFECT OF VARYING THE OPERATING CONDITIONS

In these examples, using the techniques and procedure of Example 1, the effect of varying the operating temperature, pressure and reactant mole ratios has been examined. The standard catalyst throughout these experiments is palladium acetate-triphenylphosphine solubilized in quinoline, isopropanol mixture (2:1, v/v). The results are summarized in Table 4. It is evident from the data that butadiene conversion to isopropyl nonadienoate may be achieved with this catalyst system over a wide range of conditions, as follows:

(1) Molar ratios of triphenylphosphine to palladium salt ranging up to at least 5:1
(2) Operating temperatures of 30° to 150° C.
(3) Superatmospheric pressures from at least 200 psig to 3000 psig or greater.

EXAMPLES 49 to 53

THE DIMERIZATION/CARBONYLATION OF BUTADIENE CATALYZED BY VARIOUS SOLUBLE PALLADIUM CATALYSTS - EFFECT OF HYDROXYLATED COREACTANT STRUCTURE

In these examples, using the same experimental procedure as described in Example 1, 1,3-butadiene is dimerized, carbonylated in the presence of typical primary, secondary and tertiary alkanols. Other quantities of reactants, palladium catalyst and heterocyclic amine base remain unchanged. The reaction mixture in each case is sealed and pressured to 700 psig and heated to 110° C. for 6 to 18 hours. The major products are identified in each case as nonadienoate esters, primarily 3,8-nonadienoate esters (see Table 5).

When water is present in excess as the hydroxylated coreactant, then the primary product is nonadienoic acid (Example 53).

EXAMPLE 54

THE SYNTHESIS OF ISOPROPYL NONADIENOATE FROM 1,3-BUTADIENE - MULTIPLE PALLADIUM CATALYST RECYCLE

To a glass-lined autoclave reactor equipped for pressurizing, heating, cooling and means of agitation is added a degassed sample of isoquinoline (40 ml) and isopropanol (20 ml). Triphenylphosphine (3.50 gm) and palladium acetate (0.60 gm, 2.68 mmole) are added under a nitrogen environment and the mixture stirred to give a deep-red solution with some undissolved solids.

Table 3

| | Butadiene Dimerization/Carbonylation-Effect of Solvent Structure[a] | | | | |
|---|---|---|---|---|---|
| | Pd catalyst | | Isopropyl nonadienoate | | Total ester/ $C_8$-polyene | Pd recovery[b] |
| Example | composition | Solvent composition | Yield(mol%) | Selectivity(%) | ratio | (%) |
| 22 | Pd(OAc)$_2$-2PPh$_3$ | None | 31 | 88.1 | 2.3 | 9.5 |
| 23 | " | Quinoline | 45 | 96.8 | 3.36 | 34 |
| 24 | " | Isoquinoline | 41 | 97.4 | 3.1 | 40 |
| 25 | " | Lepidine | 58 | 84.5 | 4.57 | 21 |
| 26 | " | Quinaldine | 30 | >99 | 1.80 | |
| 27 | " | Acridine | 41 | 93.2 | 3.79 | |
| 28 | " | Pyridine | 31 | 96.5 | N.D. | 26 |
| 29 | " | 3,5-Lutadine | 25 | 89.2 | 1.30 | 24 |
| 30 | " | 8-Aminoquinoline | 4.9 | 94.3 | 0.36 | 28 |
| 31 | " | Imidazole | <5 | N.D. | — | 28 |
| 32 | " | Tetraethylenepentamine | None | — | — | 14 |
| 33 | " | Indole | 5.3 | 83.5 | 0.38 | 7.4 |
| 34 | " | N-Methylmorpholine | 3.8 | 92.6 | N.D. | 18 |
| 35 | " | Triethylamine | 3.0 | 79 | 0.15 | |
| 36 | " | 1-Methylimidazole | 16 | 85.3 | N.D. | 25 |
| 37 | " | N,N-Dimethyl formamide | 31 | 94.1 | 1.8 | 22 |
| 38 | " | N-Methyl-2-pyrrolidine | 30 | >99 | 1.9 | 24 |
| 39 | " | N,N-Diethylaniline | 46 | 95 | 3.5 | 36 |

[a]Experimental run conditions: initial [Pd], 22 mM; $C_4H_6$, 0.37 mole, solvent amine/isopropanol (v/v) ratio, 2:1; pressure (initial) 700 psig; operating temp; 110° C; 18 hr.
[b]Determined from palladium concentration in crude product liquid.

The reactor is sealed, deoxygenated with a purge of nitrogen, and butadiene (10 gm, 0.185 mole) injected in from a side ampoule. The reactor is further pressured to 700 psig with carbon monoxide and the mixture heated, with agitation, to 110° C. At the end of 6 hr the reaction is terminated by rapid cooling. A summary of the GC data for the recovered crude reddish-brown liquid product are given in Table 6.

Following analyses, the recovered product liquid (84 ml) is recharged to the glass-lined reactor, a second 10-gm sample of butadiene injected from the side ampoule, and the mixture carbonylated as described supra. Carbonylation of a third butadiene sample (10 gm) is carried out likewise. The fourth and fifth cycles of the same palladium catalyst solution are completed in the presence of additional isopropanol (6–10 ml).

After five cycles the crude liquid product (106 ml) is subject to distillation in vacuo. Following removal of the light ends, the fraction distilling at 63°–68° (0.5–1.0 mm Hg) is substantially isopropyl nonadienoate. Further purification of this ester fractions, particularly separation from the remaining isoquinoline solvent may be achieved in a second distillation, in vacuo.

Run data are summarized in Table 6.

EXAMPLE 55

SYNTHESIS OF ISOPROPYL NONADIENOATE FROM 1,3-BUTADIENE - MULTIPLE PALLADIUM CATALYST RECYCLE

Following the procedure of Example 54, palladium acetate (0.30 gm, 1.34 mmole) and tri-n-butylphosphine (0.54 gm) are added to a degassed sample of isopropanol (20 ml) and quinoline (40 ml), the mixture stirred under a nitrogen environment, the reactor sealed and butadiene (20 gm, 0.37 mole) injected in from the side ampoule. After pressurizing to 700 psig with carbon monoxide, the mixture is heated to 110° C., with agitation for 6 hr. At the end of this time the reaction is terminated by rapid cooling.

Following analyses, the recovered product liquid (84 ml) is recharged to the glass-lined reactor with additional isopropanol (10 ml), a second butadiene sample (20 gm) injected and the mixture carbonylated as described supra. Carbonylation of third and fourth butadiene samples are completed likewise in the presence of additional samples of isopropanol (10–15 ml). Analyses of the liquid products from each of the four cycles of the palladium catalyst are summarized in Table 7. Elemental analyses of the crude liquid product after four cycles (176 ml) confirms at least 92% palladium recovery, basis the 1.34 mmole $Pd(OAc)_2$ originally charged.

Table 4

Butadiene Dimerization/Carbonylation - Effect of Varying the Operating Conditions[a]

| Example | Catalyst composition | Operating temp (° C) | Max. pressure (psig) | Reaction time(hr) | Isopropyl nonadienoate Selectivity (%) | Yield (mole %) |
|---|---|---|---|---|---|---|
| 40 | $Pd(OAc)_2$-$PPh_3$ | 110 | 900 | 5.5 | 95.4 | 6.3 |
| 41 | $Pd(OAc)_2$-$5PPh_3$ | " | 890 | 5.5 | 85.2 | 29 |
| 42 | $Pd(OAc)_2$-$2PPh_3$ | 150 | 1080 | 18 | 74.4 | <5 |
| 43 | " | 70 | 890 | 18 | 99 | 13 |
| 44 | " | 30 | 720 | 48 | 86.8 | <5 |
| 45 | " | 120 | 200 | 18 | 98.0 | <5 |
| 46 | " | 110 | 500 | 18 | 96.0 | 36 |
| 47 | " | " | 1925 | 18 | 97.5 | 24 |
| 48 | " | " | 3100 | 18 | 95.3 | 20 |

[a]Run conditions: $Pd(OAc)_2$, 1.34–2.67 mmole; $C_4H_6$, 0.37 mole; quinoline/isopropanol (2:1, v/v) solvent.

Table 5

Butadiene Dimerization/Carbonylation - Effect of Hydroxylated Coreactant Structure[a]

| Example | Catalyst composition | Amine base | Coreactant structure | Identity | Yield (mol %) | Sel. (%) |
|---|---|---|---|---|---|---|
| 49 | $Pd(OAc)_2$-$2P(n-Bu)_3$ | Quinoline | iso-Propanol | iso-Propyl nonadienoate | 61.6 | 91.4 |
| 50 | " | " | Methanol | Methyl nonadienoate | 44.6[b] | 93.0 |
| 51 | " | " | tert-Butanol | tert-Butyl nonadienoate | 48.8 | 95.8 |
| 52 | $Pd(OAc)_2$-$2PPh_3$ | Isoquinoline | Ethanol | Ethyl nonadienoate | 44 | 95.5 |
| 53 | $Pd(OAc)_2$-$2P(n-Bu)_3$ | " | Water | Nonadienoic acid | 50 | 80 |

[a]Run conditions: [Pd], 22.3 mM; $C_4H_6$, 0.37 mole; quinoline/coreactant ratio 2:1 (v/v); 700 psig initial pressure, 110° C; 18hr.
[b]Run conditions: [Pd], 44.6 mM; $C_4H_6$, 0.18 mole, 6 hr.

Table 6

Butadiene Dimerization/Carbonylation - Multiple Palladium Catalyst Recycle[a]

| Cycle | Catalyst composition | Isopropyl nonadienoate Yield (mol %) | Selectivity (%) | Total ester/ $C_8$-polyene ratio (wt %) |
|---|---|---|---|---|
| I | $Pd(OAc)_2$-$5PPh_3$ | 41 | 85.2 | 2.9 |
| II | Recycle | 41 | 87.1 | 2.6 |
| III | " | 45 | 88.3 | 3.6 |
| IV | " | 43 | 90.4 | 3.7 |
| V | " | 12 | 90.4 | 3.7 |

[a]Run conditions: initial $Pd(OAc)_2$ charged, 2.67 mmole; $C_4H_6$ added per cycle, 0.185 mole; operating temp., 110° C; initial pressure, 700 psig; 6 hr.

EXAMPLE 56

SYNTHESIS OF ISOPROPYL NONADIENOATE FROM 1,3-BUTADIENE - MULTIPLE PALLADIUM CATALYST RECYCLE

Using the procedure, reactants and techniques of Example 55, a sample of palladium acetate (0.30 gm, 1.34 mmole) and tri-n-butylphosphine (0.54 gm) was subject to three butadiene dimerization, carbonylation cycles charging fresh butadiene (20 gm) at each cycle. Analytical data for the liquid products from each of the three cycles of the palladium catalyst are summarized in Table 8. Elemental analyses of the final product liquid (148 ml), after three cycles, confirms 95% palladium recovery, basis the 1.34 mmole Pd(OAc)$_2$ originally charged.

Table 7
Butadiene Dimerization/Carbonylation - Multiple Palladium Catalyst Recycle[a]

| Cycle | Catalyst composition | Isopropyl nonadienoate Yield (mol %) | Selectivity (%) | Total ester/ $C_8$-polyene ratio (wt) |
|---|---|---|---|---|
| I | Pd(OAc)$_2$-2P(n-Bu)$_3$ | 52 | 87.8 | 4.9 |
| II | Recycle | 65 | 90.7 | 4.6 |
| III | " | 53 | 92.3 | 4.7 |
| IV | " | 44 | 92.4 | 3.7 |

[a]Run conditions: initial Pd(OAc)$_2$ charged, 1.34 mmole; C$_4$H$_6$ added per cycle, 0.37 mole; operating temp., 110° C; initial pressure, 700 psig; 18 hr.

Table 8
Butadiene Dimerization/Carbonylation - Multiple Palladium Catalyst Recycle[a]

| Cycle | Catalyst composition | Isopropyl nonadienoate Yield (mol %) | Selectivity (%) | Total ester/ $C_8$-polyene ratio (wt) |
|---|---|---|---|---|
| I | Pd(OAc)$_2$-2P(n-Bu)$_3$ | 55 | 78.4 | 5.3 |
| II | Recycle | 61 | 83.6 | 5.4 |
| III | " | 66 | 85.3 | 5.7 |

[a]Run conditions: initial Pd(OAc)$_2$ charged, 1.34 mmole; C$_4$H$_6$ added per cycle, 0.37 mole; 110° C, 700 psig initial pressure; 18 hr.

EXAMPLE 57

THE SYNTHESIS OF ISOPROPYL NONADIENOATE FROM 1,3-BUTADIENE - MULTIPLE PALLADIUM CATALYST RECYCLE

Following the procedure of Example 54, palladium acetate (0.30 gm, 1.34 mmole) and triphenylphosphine (0.70 gm) are added to a degassed sample of isopropanol (20 ml) and isoquinoline (40 ml), the mixture stirred under a nitrogen environment, the reactor sealed and butadiene (20 gm, 0.37 mole) injected in from the side ampoule. After pressuring to 700 psig with carbon monoxide, the mixture is heated to 110° C., with agitation, for 18 hr. At the end of this time the reaction is terminated by rapid cooling. Gas chromatographic analyses of the deep-red crude liquid product are summarized in Table 9.

The recovered product liquid (84 ml) is recharged to the glass-lined reactor, a second 20 gm sample of butadiene injected from the side ampoule, and the mixture carbonylated as described supra. Carbonylation of a third butadiene sample (20 gm) is completed in the presence of additional isopropanol (20 ml), and the crude liquid product (136 ml) subject to vacuum distillation. The fraction distilling at 63°-68° C. (0.5-1.0 mm Hg) is substantially isopropyl nonadienoate.

In a comparative experiment (cycles IA → IIIA), the multiple syntheses of isopropyl nonadienoate ester are carried out using palladium acetate (0.30 gm) and triphenylphosphine (0.70 gm) solubilized in isopropanol (60 ml) alone, in the absence of added isoquinoline base. Palladium recovery after three cycles is 4.2% basis the Pd(OAc)$_2$ originally charged.

It is evident from a comparison of the data in Table 9, with added tertiary nitrogen base (cycles I → III) vs no added base (cycles IA → IIIA) that the addition of isoquinoline ensures:

(1) Improved palladium catalyst performance, with higher yields of isopropyl nonadienoate per cycle, particularly during recycle runs.

(2) Improved selectivity to desired isopropyl nonadienoate.

(3) Improved palladium catalyst stability, without the formation of palladium "mirrors" or the precipitation of other insoluble palladium species.

Table 9
Butadiene Dimerization/Carbonylation- Multiple Palladium Catalyst Recycle[a]

| Cycle | Catalyst composition | Added amine base | Isopropyl nonadienoate Yield (mol %) | Selectivity (%) | Total ester/ $C_8$-olefin ratio (wt) |
|---|---|---|---|---|---|
| I | Pd(OAc)$_2$-2-PPh$_3$ | Isoquinoline | 41 | 99.3 | 3.1 |
| II | Recycle | " | 57 | 97.4 | 3.1 |
| III | " | " | 48 | 97.2 | 2.3 |
| IA | Pd(OAc)$_2$-2PPh$_3$ | None | 31 | 88.9 | 2.1 |
| IIA | Recycle | " | 14 | 89.4 | 1.8 |
| IIIA | " | " | <1 | 89.0 | 1.2 |

[a]Run conditions: initial Pd(OAc)$_2$ charged, 1.34 mmole; C$_4$H$_6$ added per cycle, 0.37 mole; operating temp, 110° C; initial pressure, 700 psig; 6 hr.

EXAMPLE 58

THE DIMERIZATION, CARBONYLATION OF 2-METHYL-1,3-BUTADIENE (ISOPRENE)

Following the procedure of Example 1, palladium acetate (0.30 gm, 1.34 mmole) and tri-n-butylphosphine (0.54 gm) are added to a degassed sample of isopropanol (20 ml) and pyridine (40 ml), the mixture stirred under a nitrogen environment, and isoprene (12.6 gm, 0.185 mole) added. The reactor is sealed, pressured to 700 psig with carbon monoxide, and the mixture heated to 160° C., with agitation, for 18 hr. Reaction is terminated by rapid cooling and the yellow liquid product (70 ml) analyzed by gas chromatography. Isopropyl dimethylnonadienoate is confirmed as a major product. Palladium concentration in the liquid product is 0.15%.

As the numerous examples and preceding discussion have documented, numerous advantages accrue from the practice of this invention both in its compositional and process aspects. For example, a relatively large group of ligand stabilized palladium catalysts are provided which are useful as catalysts for the one-step dimerization, carbonylation of aliphatic conjugated dienes to their unsaturated carboxylic acid/ester derivatives. Furthermore, it is disclosed that the performances of these catalysts, particularly their activity, stability and selectivity, are significantly improved through the addition of certain classes of tertiary nitrogen bases, defined herein, and that in the presence of said bases, multiple syntheses of desired ester may be readily effected using the same palladium catalyst sample without unacceptable loss of activity or the formation of insoluble palladium species.

Finally, the invention is quite advantageous in that numerous substitutions, modifications and changes can be made without departing from the inventive concept. However, the scope of the subject invention can best be understood by examining the claims which follow, read in conjunction with the preceding specification.

What is claimed is:

1. The process of this invention whereby unsaturated carboxylic (fatty) acids and their ester derivatives are prepared from aliphatic conjugated diene substrates containing from 4 to 8 carbon atoms according to the procedure of:
    (a) Admixing each two moles of said aliphatic conjugated diene with a three component mixture consisting of:
        (i) At least a catalytic quantity of a palladium catalyst consisting of one or more palladium salts in combination with one or more tertiary phosphorus containing donor ligands.
        (ii) At least a molar equivalent of hydroxylated coreactant selected from the group consisting of water or an aliphatic alkanol containing 1 to 12 carbon atoms.
        and (iii) A nitrogen-containing tertiary base selected from the three classes of nitrogen-containing bases consisting of N-heterocyclic amine bases, aryl-containing tertiary amine bases and aliphatic tertiary amides, to form a reaction mixture.
    (b) Pressurizing said reaction mixture with sufficient carbon monoxide to satisfy the stoichiometry of the carbonylation reaction.
    (c) Heating said pressurized reaction mixture to temperatures of from 30° to 150° C. until substantial formation of desired unsaturated aliphatic carboxylic acid derivatives is achieved.

2. The process of claim 1 wherein the aliphatic conjugated diene substrate is 1,3-butadiene.

3. The process of claim 1 wherein the palladium salt is selected from the group of palladium salts consisting of palladium(II) acetate, palladium(II) nitrate, palladium(II) sulfate and palladium(II) aceylacetonate.

4. The process of claim 1 wherein the palladium salt is one or more palladium halides and said process is conducted in the presence of at least a molar excess of alkali or alkaline earth acetate.

5. The process of claim 1 wherein the tertiary phosphorus-containing donor ligands are selected from the group consisting of triphenylphosphine, tri-n-butylphosphine, triethylphosphine, tri-p-tolylphosphine, tricyclohexylphosphine and trioctylphosphine.

6. The process of claim 1 wherein the palladium catalyst is prepared in situ by adding as separate components to the reaction mixture the palladium salts and the tertiary phosphorus-containing donor ligands.

7. The process of claim 1 wherein the palladium catalyst is preformed from the palladium salt and tertiary phosphorus-containing donor ligand components, prior to mixing with conjugated diene substrate, hydroxylated coreactant and nitrogen-containing tertiary base.

8. The process of claim 1 wherein the N-heterocyclic amine base is selected from the group of bases consisting of pyridine, alkylated pyridines, quinoline, isoquinoline, alkylated quinolines and isoquinolines, and acridine.

9. The process of claim 1 wherein the aryl containing amine base is selected from the group of bases consisting of N,N-dimethylaniline, N,N-diethylaniline, and N,N-diethyltoluidine.

10. The process of claim 1 wherein the aliphatic tertiary amide base is selected from the group consisting of N,N-dimethylformamide and N-methyl-2-pyrrolidone.

11. The process of claim 1 for preparing unsaturated carboxylic acid esters wherein said aliphatic alkanol is selected from the group consisting of methanol, ethanol, isopropanol and tert-butanol.

12. The process of claim 1 for preparing unsaturated carboxylic acids wherein said hydroxylated coreactant is water.

13. The process of claim 1 for preparing unsaturated carboxylic acid esters wherein said hydroxylated coreactant is polyol.

14. The process of this invention whereby, following the synthesis of unsaturated carboxylic acids and their derivatives according to the procedure of claim 1, the recovered palladium catalyst, hydroxylated coreactant and tertiary nitrogen containing base are reused to convert additional aliphatic conjugated dienes to their unsaturated acid derivatives.

* * * * *